United States Patent
Tu et al.

(10) Patent No.: US 8,649,306 B2
(45) Date of Patent: *Feb. 11, 2014

(54) USING RECEIVE DIVERSITY TO EXTEND STANDBY TIME IN QPCH MODE

(75) Inventors: Kuang-Hsuan Tu, San Diego, CA (US); Nagabhushana Rao Kurapati, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 760 days.

This patent is subject to a terminal disclaimer.

(21) Appl. No.: 12/536,970

(22) Filed: Aug. 6, 2009

(65) Prior Publication Data

US 2010/0210321 A1  Aug. 19, 2010

Related U.S. Application Data

(63) Continuation of application No. 11/102,065, filed on Apr. 8, 2005, now Pat. No. 7,586,863.

(51) Int. Cl.
 *G08C 17/00* (2006.01)
(52) U.S. Cl.
 USPC .................. 370/311; 370/442; 455/277.2
(58) Field of Classification Search
 USPC ............... 455/135, 140, 273, 277.1, 277.2; 370/311, 342, 441
 See application file for complete search history.

(56) References Cited

U.S. PATENT DOCUMENTS

| | | | |
|---|---|---|---|
| 6,144,649 A | 11/2000 | Storm et al. | |
| 6,473,601 B1 | 10/2002 | Oda | |
| 6,539,242 B1 | 3/2003 | Bayley | |
| 6,687,285 B1 | 2/2004 | Jou | |
| 6,748,010 B1 | 6/2004 | Butler et al. | |
| 6,795,425 B1 | 9/2004 | Raith | |
| 7,035,664 B2 | 4/2006 | Kim | |
| 7,062,285 B2 | 6/2006 | Yue | |
| 7,167,458 B2 | 1/2007 | Agashe et al. | |
| 7,586,863 B2 | 9/2009 | Tu et al. | |
| 2003/0156561 A1 | 8/2003 | Padovani et al. | |

(Continued)

FOREIGN PATENT DOCUMENTS

| | | |
|---|---|---|
| EP | 1480352 | 4/2004 |
| WO | WO0159945 | 8/2001 |

OTHER PUBLICATIONS

International Search Report, PCT/US2006/013883, International Searching Authority, European Patent Office Sep. 14, 2006.

(Continued)

*Primary Examiner* — Christian Hannon
(74) *Attorney, Agent, or Firm* — Kristine U. Ekwueme

(57) ABSTRACT

The standby time of a CDMA cell phone is extended by using two receive chains to monitor the Quick Paging Channel (QPCH) when the signal-to-noise ratio falls within a predetermined range. Monitoring the QPCH saves battery power by obviating the need to monitor the general paging message unless quick paging (PI) bits are set. The QPCH is not monitored, however, in noisy environments where PI bits are incorrectly detected causing the paging message to be needlessly monitored. Power is saved by monitoring the QPCH in noisier environments without increasing the incorrect detection rate. Incorrect detection is reduced in the predetermined range by using an additional receive chain to achieve receive diversity. Although additional power is consumed by the second receive chain in the predetermined range, the power saved by not demodulating the paging message at each slot more than compensates for the additional power consumed by the second receive chain.

20 Claims, 7 Drawing Sheets

(56) References Cited

U.S. PATENT DOCUMENTS

2004/0253955 A1 12/2004 Love et al.
2005/0190711 A1 9/2005 Morimoto
2006/0205444 A1 9/2006 Aerrabotu et al.

OTHER PUBLICATIONS

International Preliminary Report, on Patentability PCT/US2006/013883, IB WIPO, Switzerland, Oct. 9, 2007.

Written Opinion, PCT/US2006-013883, International Search Authority, European Patent Office. Oct. 8, 2007.

| QPCH RATE | QPCH POWER SETTING | OFFLINE QPCH MODE | | ONLINE QPCH MODE | |
|---|---|---|---|---|---|
| | | MAX BATTERY SAVINGS | RANGE OF RECEIVE DIVERSITY | MAX BATTERY SAVINGS | RANGE OF RECEIVE DIVERSITY |
| FULL RATE | -5dB | 30% | -11.5dB to -10.5dB | 12% | -11.0dB to -9.5dB |
| | -3dB | 20% | -13.0dB to -10.5dB | 10% | -12.0dB to -11.0dB |
| | 0dB | 11% | -16.0dB to -13.5dB | 4% | -14.5dB to -13.5dB |
| | 2dB | 11% | -17.5dB to -15.0dB | 4% | -16.0dB to -15.0dB |
| HALF RATE | -5dB | 21% | -14.0dB to -11.5dB | 9% | -13.0dB to -11.5dB |
| | -3dB | 17% | -16.0dB to -13.5dB | 4% | -15.0dB to -13.5dB |
| | 0dB | 12% | -18.5dB to -16.0dB | 0% | NO RANGE |
| | 2dB | 12% | -20.5dB to -18.0dB | 0% | NO RANGE |

FIG. 7

| QPCH RATE | QPCH POWER SETTING | OFFLINE QPCH MODE | | ONLINE QPCH MODE | |
|---|---|---|---|---|---|
| | | MAX BATTERY SAVINGS | RANGE OF RECEIVE DIVERSITY | MAX BATTERY SAVINGS | RANGE OF RECEIVE DIVERSITY |
| FULL RATE | -5dB | 38% | -13.0dB to -9.5dB | 17% | -12.0dB to -9.5dB |
| | -3dB | 35% | -14.0dB to -10.5dB | 17% | -13.0dB to -10.5dB |
| | 0dB | 29% | -17.0dB to -13.0dB | 11% | -16.0dB to -13.5dB |
| | 2dB | 26% | -19.0dB to -15.0dB | 11% | -17.5dB to -15.0dB |
| HALF RATE | -5dB | 35% | -15.0dB to -11.5dB | 15% | -14.0dB to -11.5dB |
| | -3dB | 30% | -17.0dB to -13.0dB | 14% | -16.0dB to -13.5dB |
| | 0dB | 25% | -20.0dB to -16.0dB | 12% | -18.5dB to -16.0dB |
| | 2dB | 25% | -22.0dB to -18.0dB | 10% | -20.5dB to -18.0dB |

FIG. 8

USING RECEIVE DIVERSITY TO EXTEND STANDBY TIME IN QPCH MODE

CLAIM OF PRIORITY

The present application is a Continuation of U.S. patent application Ser. No. 11/102,065 filed on Apr. 8, 2005 now U.S. Pat. No. 7,586,863, entitled "USING RECEIVE DIVERSITY TO EXTEND STANDBY TIME IN QPCH MODE," now allowed, assigned to the assignee hereof and expressly incorporated by reference herein.

BACKGROUND

1. Field

The present disclosure relates generally to wireless communication devices and, more specifically, to a method of monitoring paging channels to extend standby time.

2. Background

Mobile subscribers consider long battery life to be a positive attribute of a cell phone. Battery life is typically described in terms of talk time and standby time. Even when a mobile subscriber is not carrying on a conversation, his cell phone still consumes power. Standby time is the length of time a battery can power a cell phone even when no calls are made. Under the IS-95 standard promulgated by the Telecommunications Industry Association/Electronic Industry Association relating to code division multiple accessing (CDMA), when a cell phone is turned on, the cell phone first acquires a pilot channel, a synchronization channel and a paging channel before transmitting and receiving voice traffic over a traffic channel. Once the paging channel is acquired, power is conserved by shutting down certain circuitry in the cell phone until a call is received or made. Other circuitry, however, must nevertheless be powered to detect whether the cell phone is receiving a call. In the slotted paging mode of the IS-95 standard, certain circuitry is turned on periodically to monitor a general paging message in the paging channel. If the general paging message does not contain a page, the circuitry is turned off again.

Even periodically monitoring the general paging message, however, consumes power. Standby time can be further extended by using a quick paging channel (QPCH), which was introduced by the CDMA IS-2000 standard. The paging channel and the quick paging channel are distinct code channels. The quick paging channel includes quick paging bits (also called paging indicator or PI bits) that are set to indicate a page in the general paging message of the paging channel. If both quick paging bits in the quick paging channel are not set, the mobile station need not demodulate the subsequent general paging message in the general paging channel. Less energy is consumed demodulating the quick paging bits than demodulating the relatively longer general paging message. By demodulating the quick paging bits of the quick paging channel, the general paging message in the paging channel can be demodulated only when there is a page.

Under certain conditions, however, using the quick paging channel to indicate a page can consume more power than monitoring the paging channel alone. The quick paging bits are modulated with on-off keying (OOK), and demodulating a quick paging bit in a high noise environment can incorrectly indicate that the quick paging bit has been set. As the noise level rises, demodulating the quick paging bits results in a higher percentage of false alarms from incorrectly reading quick paging bits. At some noise threshold, the power required to demodulate the quick paging bits as well as the general paging message after a false alarm is greater than the power required to demodulate only the general paging message. Consequently, standby time can actually decrease when the quick paging channel is used in high noise environments.

Standby time increases when the quick paging mode can be used without increasing the percentage of false alarms. Thus, a method is sought for extending standby time by increasing the noise level at which a cell phone can operate in the quick paging mode without generating excessive false alarms.

SUMMARY

The standby time of a cell phone is extended by using two RF receive chains when the signal-to-noise ratio of the pilot channel falls within a predetermined range. The two receive chains are used in the predetermined range to monitor the Quick Paging Channel (QPCH), as defined by the CDMA IS-2000 standard. Less current is drawn to demodulate the quick paging (PI) bits of the QPCH than to demodulate the general paging message of the regular paging channel. Monitoring the QPCH saves battery power by obviating the need to demodulate the longer general paging message unless both PI bits are set. At low signal-to-noise ratios where the PI bits are often incorrectly determined to have been set, however, monitoring the general paging message only in response to detecting set PI bits can consume more power than demodulating the general paging message at each slot. At some incidence of incorrect PI bit detection, more current is drawn demodulating the PI bits plus the general paging message than merely demodulating the general paging message at each slot. Thus, the QPCH is not monitored when the signal-to-noise ratio falls below a threshold that results in an incorrect detection rate that increases power consumption.

Power consumption is reduced by allowing the QPCH to be monitored in noisier environments without increasing the incorrect detection rate. Using two antennas and two receive chains in a predetermined noise range achieves receive diversity that reduces the incidence of incorrectly detecting that the PI bits are set. Additional power is consumed, however, to power the second antenna and second receive chain used to provide receive diversity. Using the QPCH mode with receive diversity in the predetermined range consumes less power than would either the slotted paging mode or the QPCH mode without receive diversity. Although additional power is consumed to provide receive diversity in the predetermined range, the power saved by not demodulating the general paging message at each slot, as would occur in the slotted paging mode, more than compensates for the additional power consumed by the second antenna and the second receive chain. Moreover, the power saved by not demodulating the general paging message at each slot where the PI bits are incorrectly detected, as would occur more frequently in the QPCH mode without receive diversity, compensates for the additional power used to provide receive diversity. In less noisy environments above the predetermined range, the QPCH is monitored using only one antenna and receive chain. In noisier environments below the predetermined range where the incorrect detection rate would be high despite using receive diversity, the QPCH is not monitored, and the general paging message is demodulated at each slot.

In another embodiment, a circuit includes a noise detector and a state machine. The circuit demodulates I and Q samples received from a first antenna and a first receive chain and determines the value of a PI bit. In addition, the noise detector determines a signal-to-noise ratio from the I and Q samples. The state machine transitions to a next state based on the value of the quick paging bit and whether the signal-to-noise ratio falls within a predetermined range. The state machine also generates a receive chain control signal that, depending on the next state, causes a second antenna and a second receive chain to be powered. The second antenna and receive chain are powered when the signal-to-noise ratio falls within the predetermined range.

In yet another embodiment, a circuit with a state machine demodulates I and Q samples received from a first antenna and receive chain and determines the value of a PI bit. The state machine transitions to the next state based on the value of the PI bit and on whether the value of a previously detected PI bit was found to be incorrect. After two previous PI bits were determined to have a value of one, the mobile station reads the general paging message. Where the general paging message does not contain a page, the state machine determines that a previously detected PI bit value was incorrect. The state machine generates a receive chain control signal that, depending on the next state, causes a second antenna and receive chain to be powered. The second antenna and receive chain are turned on after a PI bit value is incorrectly determined. After repeatedly incorrectly detecting PI bit values, the circuit returns to a slotted paging mode to monitor the general paging message for a predetermined number of slots.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 7 is a table listing the percentage of battery power saved by using two receive chains in the listed predetermined ranges of pilot Ec/Io based on a 30% correlation between the two receive chains;

FIG. 8 is a table listing the percentage of battery power saved by using two receive chains in the listed predetermined ranges of pilot Ec/Io based on a 0% correlation between the two receive chains;

DETAILED DESCRIPTION

Reference will now be made in detail to some embodiments of the invention, examples of which are illustrated in the accompanying drawings.

Figure 1:
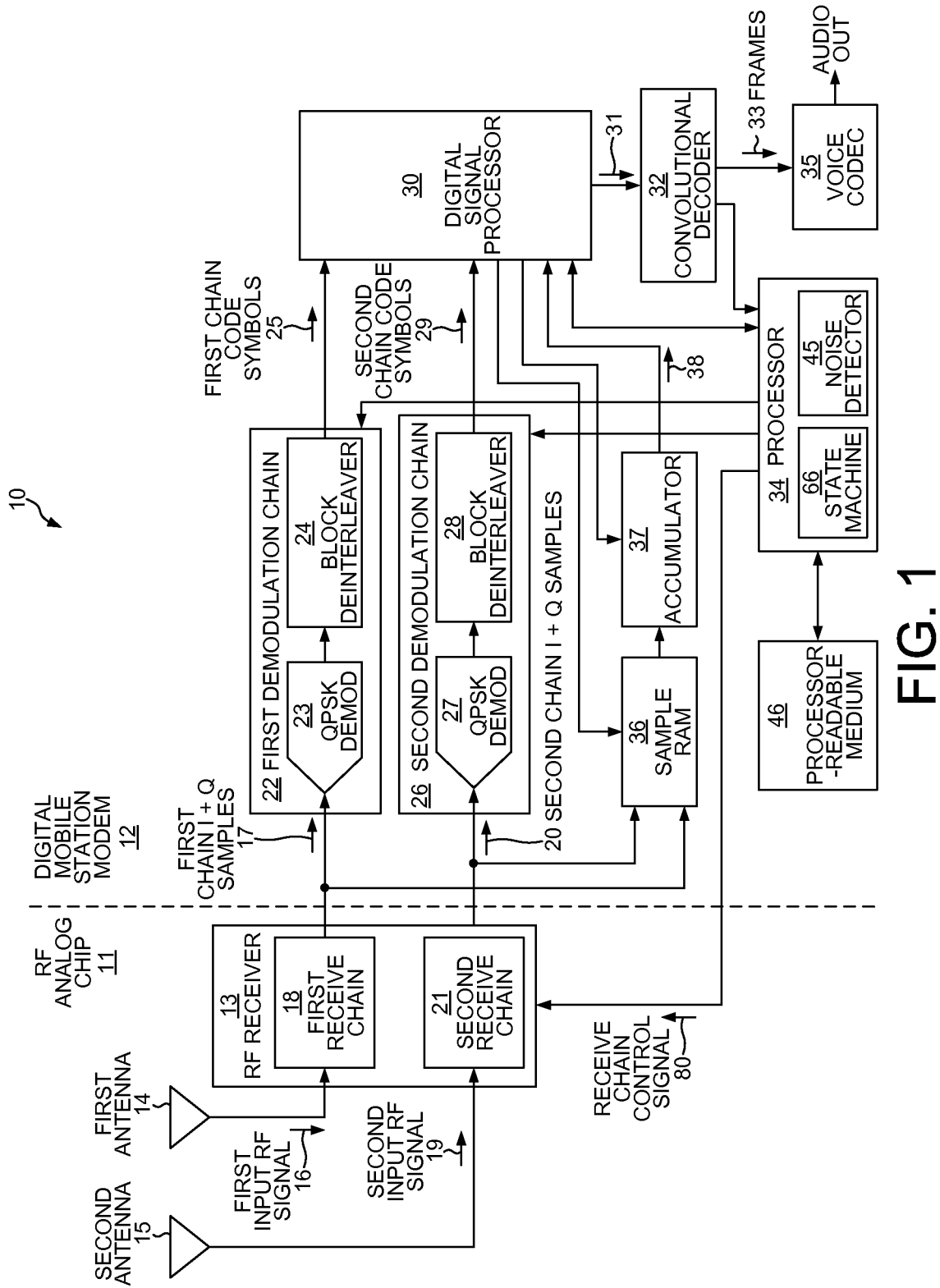
FIG. 1 is a simplified schematic block diagram of circuitry that monitors CDMA paging channels.

FIG. 1 is a simplified block diagram of circuitry 10 that monitors CDMA paging channels. Circuitry 10 is located on an RF analog chip 11 and on a digital mobile station modem 12. RF analog chip 11 includes an RF receiver 13 that is coupled to a first antenna 14 and to a second antenna 15. A first input RF signal 16 is received on first antenna 14 and is converted to first chain I and Q samples (in-phase and quadrature samples) 17 by a first receive chain 18 of RF receiver 13. A second input RF signal 19 is received on second antenna 15 and is converted to second chain I and Q samples 20 by a second receive chain 21 of RF receiver 13. Together, first antenna 14 and second antenna 15 provide "receive diversity," in which a single RF carrier signal is received from "multi-paths" as multiple RF signals, each at a different time and strength on a separate antenna. The strength and time shift of first input RF signal 16 and of second input RF signal 19 depend on the path each signal travels before arriving at first antenna 14 and second antenna 15, respectively.

First input RF signal 16 and second input RF signal 19 are transmitted by a base station to the mobile station containing circuitry 10. The base station simultaneously transmits user data for all current mobile stations in the associated cell by transmitting code channels over the RF carrier signal using different spreading sequence codes. The code channels are logical channels as opposed to frequency channels. All of the code channels share the same frequency spectrum and occupy an entire 1.2288-MHz wideband radio channel. In the IS-95 standard, the code channels include a pilot channel, a synchronization channel, several paging channels and a number of forward traffic channels. The IS-2000 standard introduced the Quick Paging Channel (QPCH), which is also a code channel.

The mobile station is powered by a battery. As circuitry 10 monitors the QPCH and the regular paging channel, battery power is consumed. Less current is drawn to demodulate the quick paging (PI) bits of the QPCH than to demodulate the general paging message. Monitoring the QPCH saves battery power by obviating the need to demodulate the longer general paging message unless both PI bits are set. At some incidence of incorrectly detecting that the PI bits are set, however, more current is drawn demodulating both the PI bits plus the general paging message than demodulating the general paging message alone. Thus, the QPCH is not monitored when the signal-to-noise ratio falls below a threshold that results in an incorrect detection rate that increases power consumption. Circuitry 10 reduces overall power consumption by allowing the QPCH to be monitored in noisier environments without increasing the incorrect detection rate. Circuitry 10 uses receive diversity to reduce the incidence of incorrectly detecting that the PI bits are set. Additional power is consumed, however, to power the additional antenna and receive chain used to provide the receive diversity. But the power saved by not demodulating the general paging message in the noisier environments more than compensates for the added power consumed by the second antenna and second receive chain that makes receive diversity possible.

In the IS-95 standard, data to be transmitted from the base station over a code channel is first grouped into 20-millisecond frames, convolutionally encoded, repeated to adjust the data rate and then interleaved. Each code channel is then orthogonally spread in the base station by one of 64 Walsh functions. Bits of the spreading Walsh function are called chips. The spreading by the Walsh functions is performed at a fixed chip rate of 1.2288 Mcps (mega chips per second). Because the Walsh functions are mutually orthogonal, the code channels spread by the Walsh functions are also orthogonal. The orthogonal spreading provides orthogonal channelization among all channels to mobile stations within the cell covered by the base station. Interference is nevertheless present from channels in neighboring cells spread using the same Walsh functions. Moreover, interference is also present because code channels in neighboring cells that are non-synchronously spread even with different Walsh functions are not time-aligned and therefore not orthogonal. Consequently, each code channel is also spread by a quadrature pair of pilot pseudonoise (PN) sequences. The resulting pair of channels is transmitted from the base station to the mobile station as a pair of quadrature phase-shift keying (QPSK) waveforms. Each of first chain I and Q samples 17 and second chain I and Q samples 20 is such a pair of QPSK waveforms. The PN sequence modulation is performed at the same clock rate as the Walsh function modulation. In one embodiment, the pilot PN binary sequence has a length of $2^{15}$, or 32,768. Thus, each code channel is transmitted as a pair of I and Q signals, each with a period of 32,768 chips. With a chip rate of 1.2288 Mcps, a period of 32,768 chips corresponds to a period of 26.67 ms.

The pilot channel is a direct-sequence spread spectrum signal transmitted at all times by each CDMA base station. The pilot channel provides a phase reference to the mobile station for coherent demodulation and allows the mobile station to acquire the timing of the forward CDMA channel. A higher power level is given to the pilot channel than to the other code channels to facilitate channel acquisition. The pilot channel is also used for comparison of signal strength between different base stations to decide when to handoff a call to an adjacent base station. The pilot channel is spread with the Walsh code zero ($W_0$), which is comprised of all zeros.

The paging channel is an encoded, interleaved, spread and modulated spread spectrum signal. The IS-95 standard defines seven regular paging channels that are spread with the Walsh code numbers 1-7. A paging channel transmits control information and pages from the base station to the mobile station. When a call is made to a mobile station, the mobile station receives a page from the base station on an assigned paging channel. The primary paging channel is spread with the Walsh code 1 ($W_1$). A mobile station first acquires the primary paging channel $W_1$. If the primary paging channel $W_1$ is not the appropriate regular paging channel, the mobile station then checks for the correct paging channel using a hashing function. The Quick Paging Channel (QPCH) is spread with a different Walsh code than the Walsh codes used for the regular paging channels. In fact, there can be multiple quick paging channels that are spread with Walsh codes such as $W_{40}$, $W_{80}$, and $W_{108}$.

Returning to FIG. 1, the paging channels are demodulated from the I and Q samples in mobile station modem 12. Mobile station modem 12 is capable of operating in two modes: an online mode and an offline mode. The online and offline modes are used to monitor the QPCH. In the online mode, first chain I and Q samples 17 are demodulated by a first demodulation chain 22. First demodulation chain 22 includes a quadrature-phase-shift-keying (QPSK) demodulator 23 and a block deinterleaver 24. QPSK demodulator 23 applies the inverse of the appropriate Walsh code for the particular paging channel and despreads first chain I and Q samples 17 using the PN sequence with which the paging channel was originally spread in the base station. The output of QPSK demodulator 23 is then deinterleaved by block deinterleaver 24. Block deinterleaver 24 outputs first code symbols 25. In an analogous manner, a second demodulation chain 26 demodulates second chain I and Q samples 20 in the online mode. Second demodulation chain 26 includes a QPSK demodulator 27 and a block deinterleaver 28. Block deinterleaver 28 outputs second code symbols 29. In the online mode, the I and Q samples are demodulated as streaming data in real time.

In the online mode, a microprocessor 30 receives, processes and combines the first code symbols 25 and the second code symbols 29. In this embodiment, microprocessor 30 is a mobile digital signal processor that processes the symbols obtained from each antenna separately and then combines the symbols in a correlated manner. Digital signal processor 30 outputs processed, rotated code symbols 31. A convolutional decoder 32, such as a Viterbi decoder, then decodes the rotated code symbols 31 and outputs frames 33 of the transmitted message, such as the general paging message. Mobile station modem 12 determines whether the transmitted message has been correctly received based on detecting a low incidence of symbol errors and on checking cyclic redundancy check (CRC) values. A processor 34 determines whether the frame-level CRC values and the message-level CRC values check. Where the transmitted message contains voice communications, data from the demodulated, deinterleaved and convolutionally decoded frames is again decoded in a voice coder/decoder (CODEC) 35 to generate an audio output signal.

In the offline mode, both first chain I and Q samples 17 and second chain I and Q samples 20 are first collected in a sample random access memory (RAM) 36, which acts as a buffer. In this embodiment, sample RAM 36 is an allocated address space in static random access memory. In other embodiments, sample RAM 36 is a separate physical memory. An accumulator 37 retrieves first chain I and Q samples 17 and second chain I and Q samples 20 from sample RAM 36 and demodulates the samples. Accumulator 37 outputs bit code symbols 38. Digital signal processor 30 receives and processes bit code symbols 38. Digital signal processor 30 correlates and combines bit code symbols 38 from different multipaths. Processor 34 then receives the processed and combined bit code symbols in the offline mode. No convolutional decoding of the processed bit code symbols is performed when monitoring the QPCH.

Figure 2:
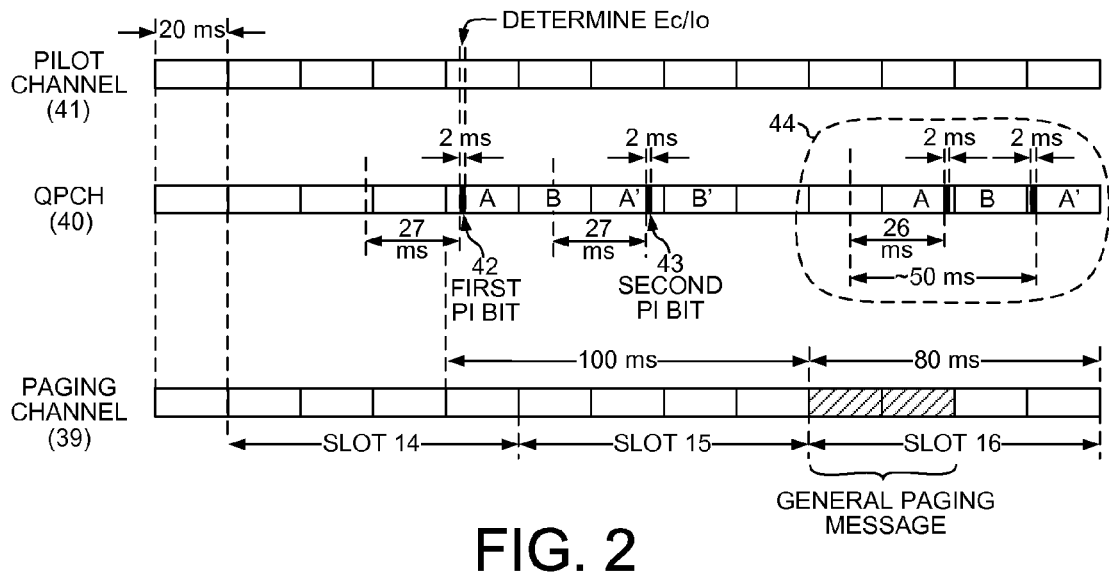
FIG. 2 is a diagram illustrating a regular paging channel and a Quick Paging Channel (QPCH) that are monitored by the circuitry of FIG. 1.

FIG. 2 illustrates a regular paging channel 39 and a Quick Paging Channel (QPCH) 40 that are being monitored by circuitry 10 of FIG. 1. Circuitry 10 also monitors the signal-to-noise ratio of a pilot channel 41. Each of regular paging channel 39, QPCH 40 and pilot channel 41 is segmented into 20-ms frames that are aligned because PN sequence modulation is performed at the same timing for all code channels. Circuitry 10 monitors QPCH 40 to determine whether the quick paging bits (PI bits) are set. Both PI bits are set, e.g., to a digital one, in the base station when a page for the mobile station is contained in the following general paging message. In the example of FIG. 2, the PI bits are located in the first and third frames that begin 100 ms before the 80-ms slot that contains the general paging message. FIG. 2 shows a first PI bit 42 located in a first frame labeled A, and a second PI bit 43 located in a third frame labeled A'. The general paging message typically occupies the first two 20-ms frames of the 80-ms slot. The general paging message for a particular mobile station appears in slots at various intervals depending on the slot cycle index (SCI). For slot cycle indices of 0, 1 and 2, the general paging message for the particular mobile station appears every sixteen, thirty-two and sixty-four slots, respectively. For example, for a slot cycle index of 0, the general paging message appears every 1.28 seconds (16×80 ms). In this example, the general paging message for the mobile station containing circuitry 10 appears in slot number sixteen. Monitoring only the general paging message in a regular paging channel is referred to as the "slotted paging" mode.

Demodulating the PI bits consumes a different amount of power depending on whether mobile station modem 12 is operating in the online mode or in the offline mode. In the online mode, I and Q samples are demodulated by a demodulation chain to determine the value of the PI bits. In this example, receive diversity is not used, and only first receive chain 18 is powered. Consequently, only first chain I and Q samples 17 are demodulated by first demodulation chain 22. About two ms of first chain I and Q samples 17 are demodulated by first demodulation chain 22 in order to determine the value of first PI bit 42. A demodulation chain (also called a "finger") is typically allowed to settle, however, before performing an accurate demodulation. In this example, first demodulation chain 22 is allowed to stabilize for roughly 26 ms. Depending on where second PI bit 43 is located within frame A', first demodulation chain 22 is stabilized again beginning 26.67 ms before demodulating another two ms of I and Q samples. While first demodulation chain 22 is stabilizing and demodulating, first receive chain 18 must be operating and outputting I and Q samples. Thus, in this example, to monitor first PI bit 42 and second PI bit 43 in the online mode, first demodulation chain 22 and first receive chain 18 consume power for about fifty-seven ms. Although about two ms of I and Q samples are demodulated in this example to determine the value of a PI bit, the actual PI bit is considerably shorter. Quick paging bits are typically transmitted at either half rate or full rate. At half rate, there are 256 chips per PI bit, and at full rate, there are 128 chips per PI bit. Thus, a half-rate PI bit has a length of about 200 μs, and a full-rate PI bit has a length of about 100 μs. First PI bit 42 and second PI bit 43 are full-rate PI bits. Transmitting PI bits at half rate can accommodate a lower number of mobile subscribers. On the other hand, receiving half-rate PI bits can result in more accurate demodulation and a lower incidence of incorrectly detecting that the PI bits are set. More than two ms of I and Q samples are typically demodulated to determine the value of a half-rate PI bit.

FIG. 2 also illustrates another scenario 44 in which a first PI bit falls towards the end of a first frame, and a second PI bit falls towards the beginning of a third frame. In scenario 44, the second PI bits follows the first PI by less than 26.67 ms, so first demodulation chain 22 does not turn off and then turn on and stabilize after demodulating the first PI bit. As a consequence, first demodulation chain 22 and first receive chain 18 consume power for only about fifty ms to demodulate about four ms of I and Q samples in scenario 44.

Circuitry 10 also monitors pilot channel 41 and paging channel 39 by demodulating first chain I and Q samples 17. First chain I and Q samples 17 are demodulated in QPSK demodulator 23 using the appropriate inverse Walsh code to obtain the desired code channel. The signal-to-noise ratio of the pilot channel (also called the signal-to-interference ratio, Ec/Io) is also determined from the two ms of first chain I and Q samples 17 captured to monitor first PI bit 42. But the zero Walsh code ($W_0$) is applied instead of the Walsh code 80 ($W_{80}$). Code symbols obtained from demodulating pilot channel 41 are processed by digital signal processor 30 and then analyzed in a noise detector 45. In this embodiment, noise detector 45 is a set of instructions operating on processor 34. The instructions are stored on a processor-readable medium 46, and processor 34 reads the instructions from processor-readable medium 46 before performing the instructions. In other embodiments, noise detector 45 is a hardware portion of processor 34. Noise detector 45 determines the pilot Ec/Io from I and Q samples captured at various times, including at the time of first PI bit 42, at the time of second PI bit 43 and at the time of the general paging message.

Demodulating the PI bits consumes less power in the offline mode than in the online mode. In the offline mode, I and Q samples are not demodulated in real time by a demodulation chain, but are instead collected in sample RAM 36 and later demodulated by accumulator 37. Therefore, the demodulation chains are not turned on to stabilize before capturing the two ms of I and Q samples used to determine the value of a PI bit. In the offline mode, first demodulation chain 22 and first receive chain 18 consume power for only about four ms to monitor first PI bit 42 and second PI bit 43, instead of the approximately fifty-seven ms in the online mode.

Figure 3:
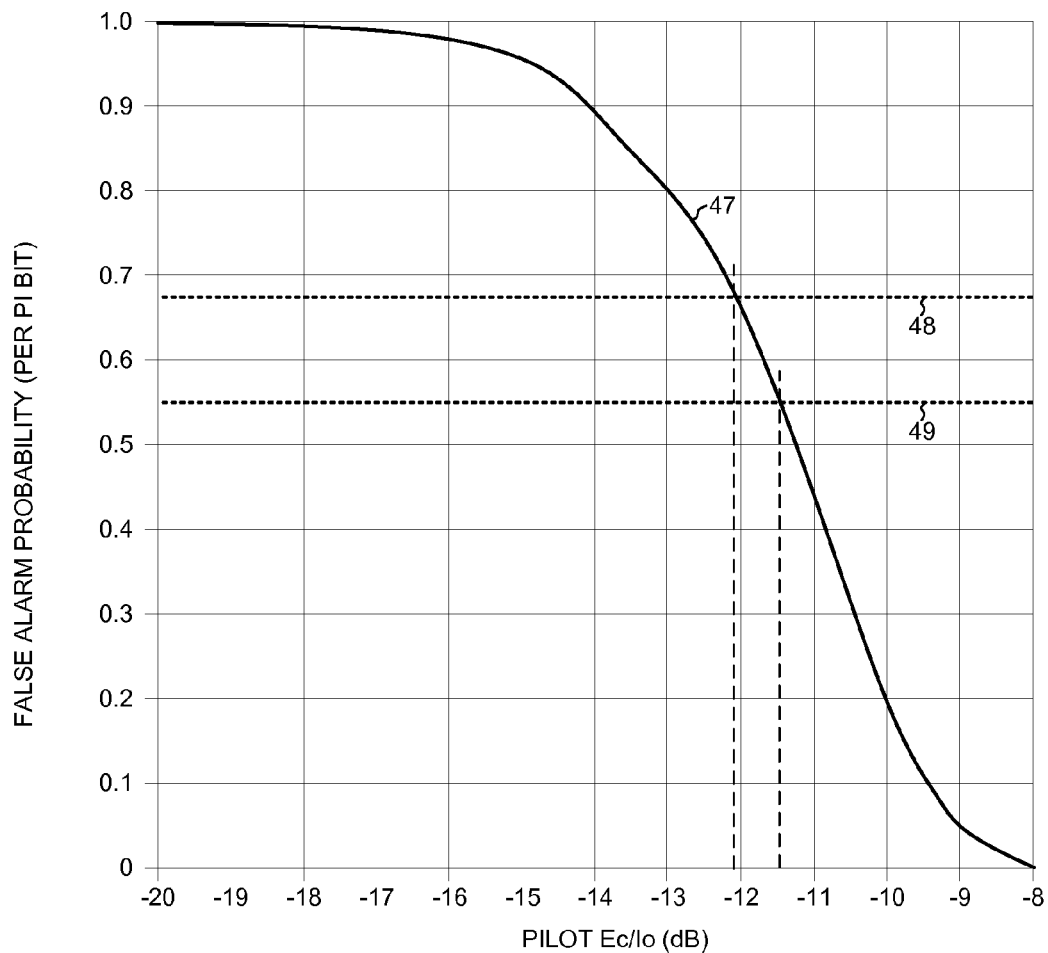
FIG. 3 is a diagram plotting pilot Ec/Io versus the probability of incorrectly detecting that a quick paging bit of the QPCH of FIG. 2 has been set.

FIG. 3 is a diagram showing the relationship between pilot Ec/Io and the incidence of incorrectly detecting that a PI bit has been set, expressed as the "false alarm probability" per PI bit. Although pilot Ec/Io is a unitless relationship denoting the signal-to-noise ratio of the pilot channel, pilot Ec/Io is listed here in decibels (dB) for ease of reference. A curve 47 shows that the false alarm probability increases as pilot Ec/Io decreases. Curve 47 describes the false alarm probability of full rate PI bits where the power of QPCH 40 is −3 dB below the power of pilot channel 41. FIG. 3 also shows the false alarm probability 48 in the offline QPCH mode that results in a power consumption rate equal to that of the slotted paging mode. Thus, when the pilot Ec/Io falls below a threshold of about −12.1 dB, the battery power consumed to demodulate both PI bits plus the general paging message when the PI bits are found to be set (at about a 67% incidence of incorrectly valuing a single PI bit) is more than the power consumed to demodulate only the general paging message at each slot. FIG. 3 also shows the false alarm probability 49 in the online QPCH mode that results in a power consumption rate equal to that of the slotted paging mode. Probability 49 in the online mode is lower than probability 48 in the offline mode because circuitry 10 consumes more power in the online mode to monitor the PI bits. Because more power is consumed in the online mode, the false alarm probability in the online QPCH mode must be lower to result in the same power consumption rate as the slotted paging mode. In the online mode, when the pilot Ec/Io falls below a threshold of about −11.5 dB, the power consumed in the full-rate QPCH mode with −3 dB QPCH/pilot power at about a 55% incidence of incorrectly valuing a single PI bit is more than the power consumed in the slotted paging mode. Applying receive diversity in a predetermined range of signal-to-noise ratios to decrease the false alarm probability allows the offline QPCH mode to be used below −12.1 dB without consuming more power than in the slotted paging mode.

Figure 4:
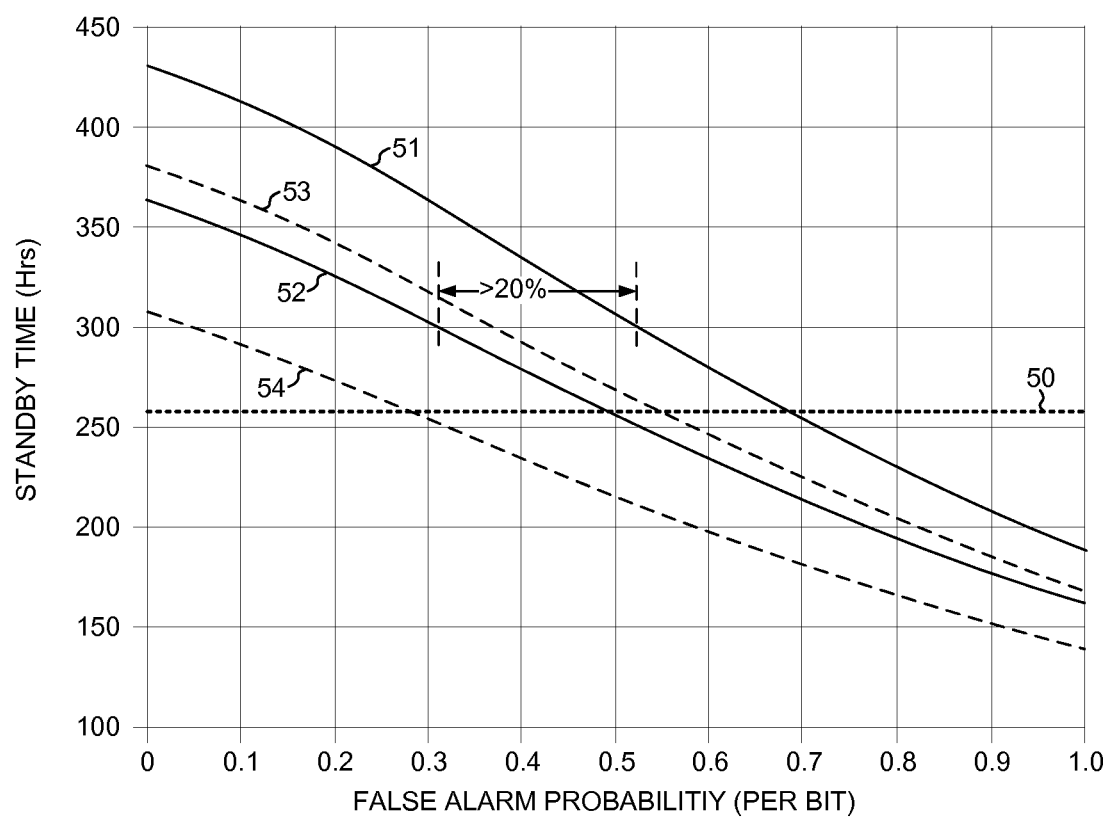
FIG. 4 is a diagram plotting the probability of incorrectly detecting a quick paging bit versus the standby time of a mobile station.

FIG. 4 illustrates the relationship between false alarm probability per PI bit and standby time using one receive chain and two receive chains. As the false alarm probability increases, the standby time decreases. As a comparison, a standby time 50 is shown for the slotted paging mode using one receive chain. A curve 51 shows how the standby time of the mobile station containing circuitry 10 changes with false alarm probability using only first receive chain 18 in the offline QPCH mode. A curve 52 shows the relationship between standby time and false alarm probability using both first receive chain 18 and second receive chain 21. Curve 52 shows that to obtain a standby time of 300 hours in the offline QPCH mode with receive diversity, a false alarm probability must be achieved that is about 20 percentage points lower than the false alarm probability that results in a 300-hour standby time in the offline QPCH mode using just one receive chain. In this example, where receive diversity improves the signal-to-noise ratio to such an extent that the false alarm probability decreases by more than about 20%, using receive diversity can increase standby time. FIG. 4 also shows the relationship between false alarm probability and standby time in the online QPCH mode. A dashed curve 53 shows the relationship between standby time and false alarm probability using only first receive chain 18 in the online QPCH mode. Whereas a longer standby time is achieved in the slotted paging mode than in the offline QPCH mode at false alarm probabilities above about 68%, dashed curve 53 shows that the slotted paging mode produces longer standby times than does the online QPCH mode at false alarm probabilities above about 55%. The offline QPCH mode can achieve longer standby times despite higher false alarm probabilities because the offline QPCH mode consumes less power than does the online QPCH mode. A dashed curve 54 shows the relationship between standby time and false alarm probability using both first antenna 14 and first receive chain 18 as well as second antenna 15 and second receive chain 21 in the online QPCH mode.

Figure 5:
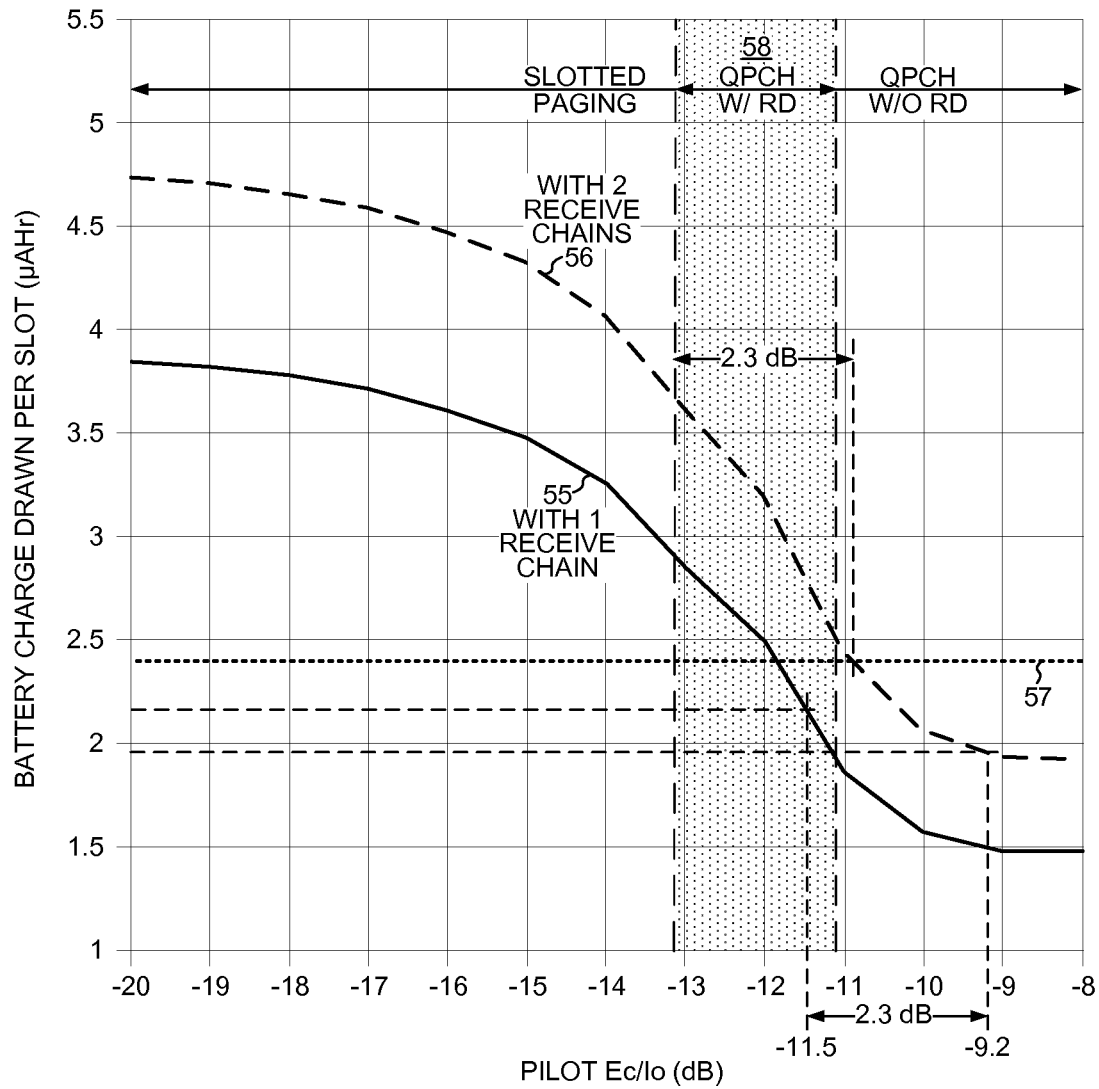
FIG. 5 is a diagram of battery charge drawn per slot as a function of pilot Ec/Io.

FIG. 5 is a diagram of battery charge drawn per slot in microampere hours (μAHr) as a function of pilot Ec/Io. As the signal-to-noise ratio deteriorates, the average total current used to monitor one general paging message increases. FIG. 5 shows the relationship of pilot Ec/Io to charge drawn by circuitry 10 with and without using receive diversity. A curve 55 shows the charge drawn in QPCH mode without receive diversity using only first receive chain 18. A dashed curve 56 shows the charge drawn in QPCH mode with receive diversity using both first receive chain 18 and second receive chain 21 (and the two antennas). Second receive chain 21 draws about an additional 60% of the charge drawn by circuitry 10 using only first receive chain 18. FIG. 5 also shows a level 57 of the battery charge drawn in the slotted paging mode without receive diversity using only first receive chain 18. Circuitry 10 draws about 2.4 μAHr of charge in the slotted paging mode without receive diversity.

Even though circuitry 10 draws about 60% more charge at a given pilot Ec/Io when second receive chain 21 is used, the average total current used to monitor one general paging message when receive diversity is turned on decreases in some ranges of pilot Ec/Io because second receive chain 21 provides a gain of about 2.3 dB in the operating Ec/Io. For example, at a pilot Ec/Io of −11.5 dB, circuitry 10 draws about 2.2 μAHr of charge using one receive chain, as shown by curve 55. When a second receive chain is used, circuitry 10 draws only about 1.9 μAHr because the operating Ec/Io improves by about 2.3 dB to a pilot Ec/Io of about −9.2 dB, as shown by dashed curve 56.

Below a pilot Ec/Io of about −11.9 dB, more charge is drawn in the QPCH mode than in the slotted paging mode using one receive chain. If two receive chains are used, however, less charge is drawn in the QPCH mode down to a pilot Ec/Io of about −13.1 dB. Battery power is saved by continuing in QPCH mode until a pilot Ec/Io of about −13.1 dB, and only then switching to the slotted paging mode in which QPCH 40 is no longer monitored. Using two receive chains in the QPCH mode within a range of pilot Ec/Io above the threshold pilot Ec/Io of −11.9 dB also draws less charge than using just one receive chain. Using two receive chains to monitor the paging channels consumes less power in the QPCH mode up to a pilot Ec/Io of about −11.1 dB. Therefore, if the signal-to-noise ratio of the pilot channel falls within a range 58 between about −11.1 dB and about −13.1 dB, less battery charge is drawn by remaining in the QPCH mode with receive diversity than by switching to either the slotted paging mode or the QPCH mode without receive diversity. The data in FIG. 5 applies to battery charge drawn in the full-rate, online QPCH mode with QPCH channel power −3 dB below the pilot channel power. The same general relationship of pilot Ec/Io to battery charge drawn applies to the offline QPCH mode, except that less battery charge is drawn in the offline QPCH mode.

Figure 6:
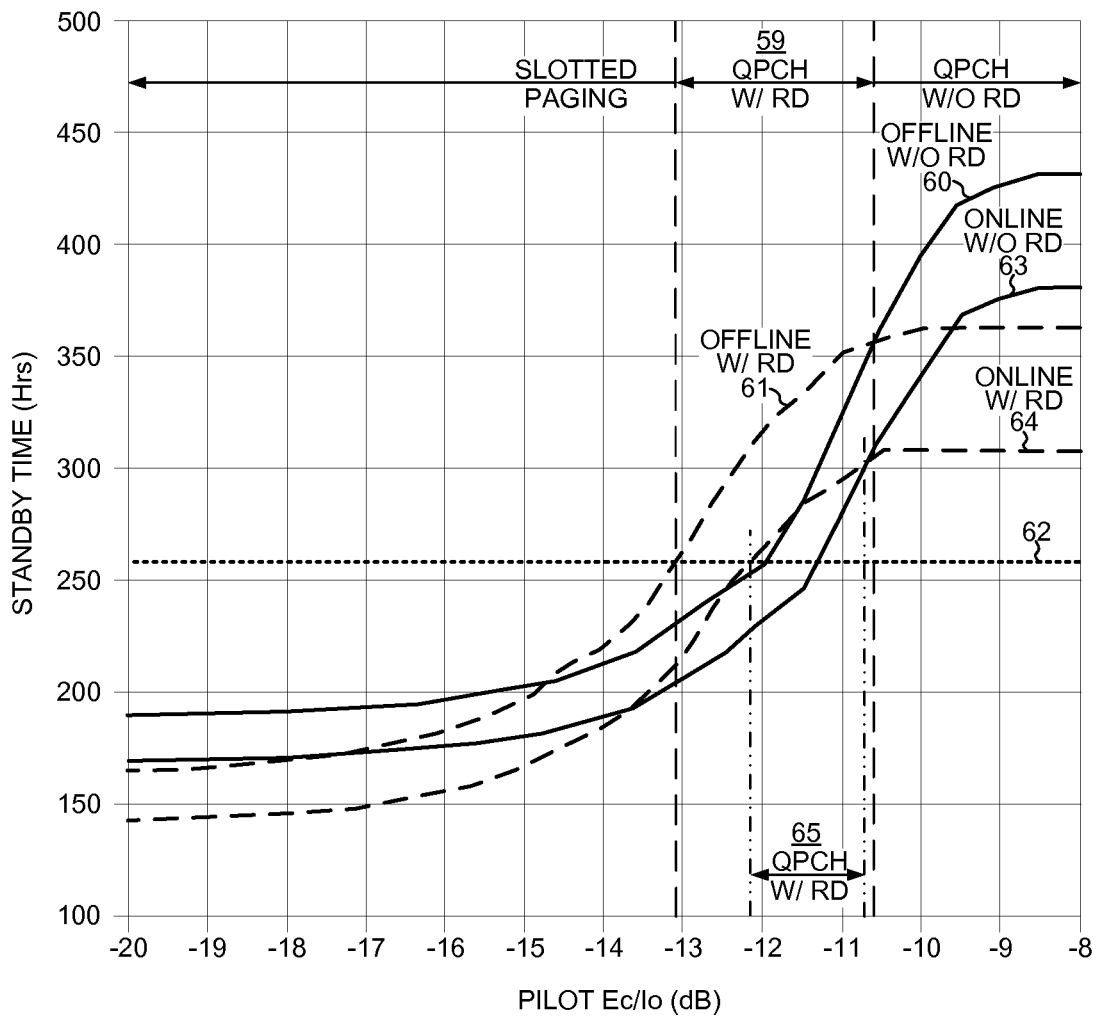
FIG. 6 is a diagram plotting pilot Ec/Io versus the standby time of a mobile station operating in QPCH mode with receive diversity when the pilot Ec/Io is in a predetermined range.

FIG. 6 is a diagram of the relationship between standby time and pilot Ec/Io for a mobile station containing an embodiment of circuitry 10 that operates in a QPCH mode with receive diversity when the pilot Ec/Io is in a predetermined range 59. When the pilot Ec/Io is outside predetermined range 59, circuitry 10 operates either in the slotted paging mode or in the QPCH mode without receive diversity. A curve 60 shows the standby time in relation to pilot Ec/Io in the offline QPCH mode using one receive chain. A dashed curve 61 shows the standby time in relation to pilot Ec/Io in the offline QPCH mode using two receive chains. Dashed curve 61 is based on a 30% correlation between the antennas of the two receive chains. Where there is a 0% correlation, the RF carrier signal is received as two independent RF signals on separate antennas. But first antenna 14 and second antenna 15 are part of a single mobile station and are separated by less than 10 cm. Therefore, the RF signals received on the two antennas are not entirely independent. There is a 30% chance that an RF signal received on first antenna 14 will also be received on second antenna 15. A curve for receive diversity with 0% correlation would be shifted to the left of dashed curve 61.

At signal-to-noise ratios above predetermined range 59 beginning at a pilot Ec/Io of about −10.7 dB, circuitry 10 achieves the longest standby time in the offline QPCH mode using one receive chain. At signal-to-noise ratios within predetermined range 59 from about −13.1 dB to about −10.7 dB, circuitry 10 achieves the longest standby time in the offline QPCH mode using two receive chains. Finally, at a pilot Ec/Io below about −13.1 dB, circuitry 10 achieves the longest standby time in the slotted paging mode. The constant standby time achieved in the slotted paging mode is represented by a dashed line 62.

FIG. 6 also shows the standby times achieved in the online QPCH mode with and without receive diversity. Shorter standby times are achieved in the online QPCH mode at all signal-to-noise ratios because more current is drawn in the online QPCH mode than in the offline QPCH mode. A curve 63 shows the standby time in relation to pilot Ec/Io in the online QPCH mode without receive diversity. A dashed curve 64 shows the standby time in relation to pilot Ec/Io in the online QPCH mode with receive diversity. There is a narrower signal-to-noise range 65 in which the online QPCH mode using two receive chains provides a longer standby time than either the slotted paging mode or the online QPCH mode using one receive chain. Range 65 for the online QPCH mode is narrower than range 59 for the offline QPCH mode mainly because the slotted paging mode becomes more efficient at a higher signal-to-noise ratio than the online QPCH mode with receive diversity as a result of the greater power consumed in the online QPCH mode relative to the offline QPCH mode. The data in FIG. 6 applies to the full-rate QPCH mode with QPCH channel power −3 dB below the pilot channel power. Where QPCH channel power is −5 dB below the pilot channel power, the signal-to-noise range wherein the QPCH mode with receive diversity is most efficient shifts to higher Ec/Io (lower noise).

FIG. 7 is a table listing the battery savings obtained by using the QPCH mode with two receive chains in the listed predetermined ranges of signal-to-noise ratios. FIG. 7 lists the savings in battery charge drawn by using the QPCH mode with receive diversity within the listed ranges of pilot Ec/Io in comparison to switching from the QPCH mode without receive diversity directly to the slotted paging mode at the pilot Ec/Io at which the slotted paging mode draws less current. The predetermined ranges are empirically determined for the various QPCH settings of QPCH power setting, QPCH full or half rate, and QPCH online and offline mode. The data in FIG. 7 are based on a 30% correlation between the antennas of the two receive chains.

FIG. 8 also lists the battery savings obtained by using the QPCH mode with two receive chains in various listed ranges of signal-to-noise ratios. The data in FIG. 8 are based on a 0% correlation between the antennas of the two receive chains. Where first antenna 14 and second antenna 15 are not correlated, and the RF signals received on the two antennas are entirely independent, the savings in battery charge drawn obtained by using receive diversity is greater than where the antennas are correlated. As first antenna 14 and second antenna 15 are part of a single mobile station, however, some correlation between the two antennas highly likely.

Figure 9:
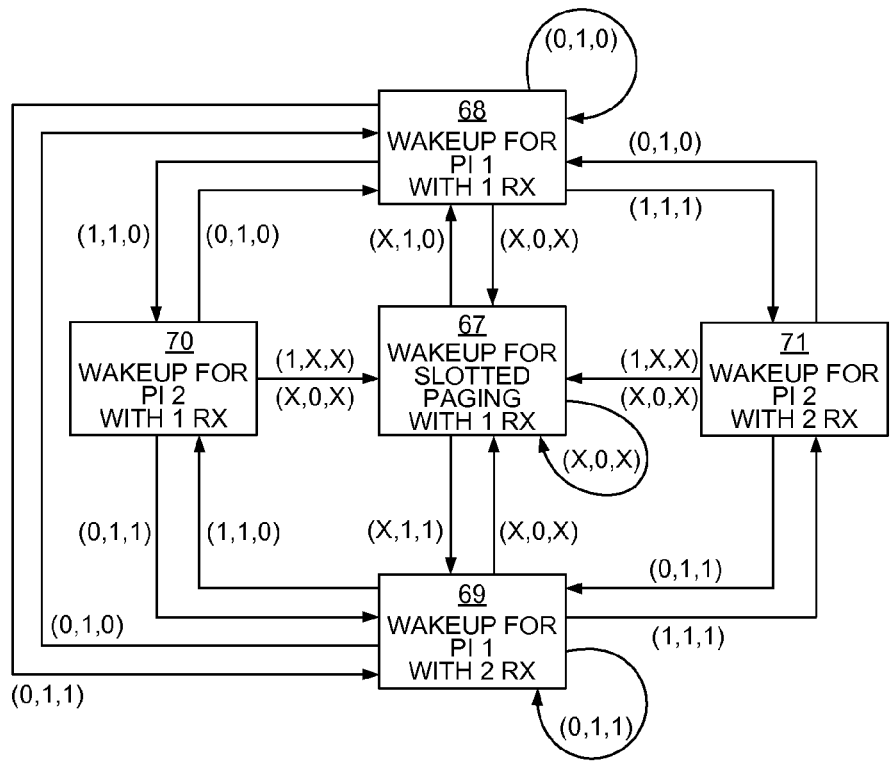
FIG. 9 is a state diagram describing the conditions for transitioning between five states based on ranges of pilot Ec/Io assigned to a slotted paging mode, a QPCH mode with receive diversity and a QPCH mode without receive diversity.

FIG. 9 is a state diagram describing the operation of a state machine 66 that determines whether circuitry 10 is to operate in one of three modes: the QPCH mode without receive diversity, the QPCH mode with receive diversity and the slotted paging mode. State machine 66 wakes up into one of five states 67-71 as circuitry 10 operates in one of the three modes. State machine 66 transitions between states based in part on the predetermined ranges listed in FIG. 7. The predetermined ranges are stored in a lookup table on processor-readable medium 46, and state machine 66 reads the predetermined ranges from the lookup table. In this embodiment, state machine 66 is a set of instructions operating on processor 34. The instructions are stored on processor-readable medium 46, and processor 34 reads the instructions from processor-readable medium 46 before performing the instructions. In other embodiments, state machine 66 is a hardware portion of processor 34.

Figure 10:
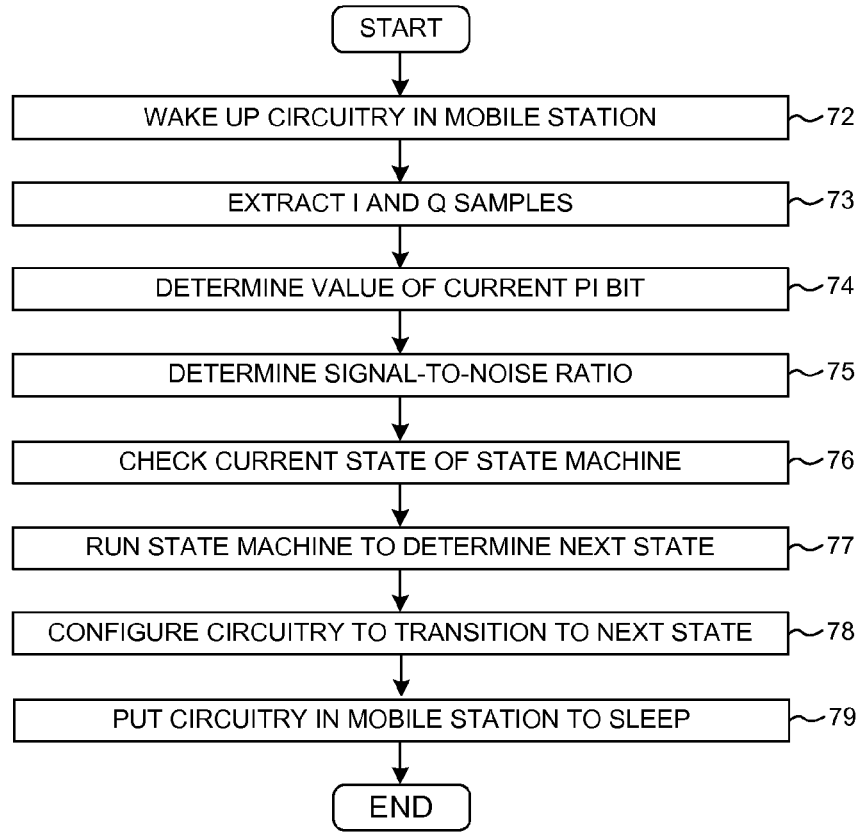
FIG. 10 is a flowchart of steps for transitioning to a next state in the state diagram of FIG. 9.

FIG. 10 is a flowchart showing steps 72-79 in a method of operating state machine 66. In a first step 72, portions of circuitry 10 in the mobile station are awakened. State machine 66 then operates while portions of circuitry 10 are awake to monitor one or more of pilot channel 41, QPCH 40 and paging channel 39. In one example, the mobile station wakes up in a first state 67 to monitor the general paging message in paging channel 39. In first state 67, circuitry 10 is operating in the slotted paging mode. To be operating in the slotted paging mode, the mobile station has turned on circuitry including first antenna 14, first receive chain 18, first demodulation chain 22, digital signal processor 30 and noise detector 45. In a previous step, state machine 66 configured processor 34 to power the appropriate circuitry upon waking up.

In a step 73, first receive chain 18 extracts first chain I and Q samples 17 from first RF input signal 16 received on first antenna 14. First demodulation chain 22 then demodulates first chain I and Q samples 17 with the inverse of Walsh code 1 ($W_1$) applicable to paging channel 39 and outputs first code symbols 25 to digital signal processor 30. First demodulation chain 22 also outputs code symbols demodulated with the inverse of Walsh code zero ($W_0$) to allow a calculation of pilot Ec/Io. Digital signal processor 30 then outputs rotated code symbols 31, which are decoded in convolutional decoder 32. Processor 34 then receives decoded frames 33 of the general paging message.

In a step 74, state machine 66 determines the value of the current PI bit. In this example, no quick paging bits are received because the mobile station awoke in the slotted paging mode. Thus, state machine 66 assigns a value of "X" to the current PI bit.

In a step 75, noise detector 45 determines the signal-to-noise ratio of the pilot channel (pilot Ec/Io) using the first chain I and Q samples 17 that were demodulated with the inverse of Walsh code zero ($W_0$).

In a step 76, processor 34 checks the current state of state machine 66. In this example, the current state is first state 67.

In a step 77, processor 34 runs state machine 66. Depending on the inputs obtained in steps 74-76, state machine 66 stays in first state 67 or transitions from first state 67 to either a second state 68 or to a third state 69. FIG. 9 shows three inputs (X, X, X) that are the basis for determining the next state. The first input is the value of the current PI bit, as determined in step 74. The first input is either X in the slotted paging mode or 1 or 0 in a QPCH mode. In FIG. 9, X is also used to denote that the value of the current PI bit can be any of 1 or 0. The second input indicates that QPCH mode is enabled in the next state. The second input is 1 when the signal-to-noise ratio determined in step 75 is equal to or above the lower limit of the predetermined range applicable to the various QPCH settings for the mobile station that relate online/offline, full/half rate and power. The second input is 0 when the signal-to-noise ratio determined in step 75 is below the lower limit of the predetermined range. In FIG. 9, X is also used to denote that the signal-to-noise ratio can be any value. The third input indicates that receive diversity is enabled. The third input is 1 when the signal-to-noise ratio determined in step 75 is equal to or above the lower limit of the predetermined range but yet equal to or below the upper limit of the predetermined range. The third input is 0 when the signal-to-noise ratio determined in step 75 is either above or below the predetermined range.

When the inputs obtained in steps 74-76 while state machine 66 is in first state 67 are (X, 0, X), the next state remains first state 67. In that case, the pilot Ec/Io was found to be below the lower limit of the predetermined range, so the mobile station will awaken in the slotted paging mode using only one receive chain.

When the inputs obtained in steps 74-76 while state machine 66 is in first state 67 are (X, 1, 0), the next state is second state 68. In that case, the pilot Ec/Io was found to be above the upper limit of the predetermined range, and state machine 66 transitions to second state 68 in which the mobile station will awaken to check the first PI bit in the QPCH mode with one receive chain.

When the inputs obtained in steps 74-76 while state machine 66 is in first state 67 are (X, 1, 1), the next state is third state 69. In that case, the pilot Ec/Io was found to be within the predetermined range, and state machine 66 transitions to third state 69 in which the mobile station will awaken to check the first PI bit in the QPCH mode with two receive chains.

In a step 78, processor 34 configures circuitry 20 such that the appropriate portions of circuitry 10 will awaken in the next state. Where the next state was determined in step 77 to be second state 68, processor 34 configures first antenna 14 and first receive chain 18 to extract first chain I and Q samples 17 when the mobile station next awakens. Processor 34 configures circuitry 10 such that only first antenna 14 and first receive chain 18 will awaken in the next state by transmitting a receive chain control signal 80 to RF receiver 13. For a mobile station operating in the offline QPCH mode, processor 34 also configures first demodulation chain 22 not to power on when the mobile station next awakens by transmitting a control signal 81 to first demodulation chain 22. In first state 67, second demodulation chain 26 has previously been configured not to awaken in the next state. Instead of being configured to perform demodulation in the demodulation chains, circuitry 10 is configured such that first chain I and Q samples 17 will be stored in sample RAM 36 and will be demodulated by accumulator 37 to generate bit code symbols 38. When the mobile station awakens in second state 68, the three inputs will be determined from bit code symbols 38.

Where the next state was determined in step 77 to be third state 69, processor 34 transmits receive chain control signal 80 to configure two receive chains to extract I and Q samples when the mobile station next awakens. First antenna 14 and first receive chain 18 will extract first chain I and Q samples 17, and second antenna 15 and second receive chain 21 will extract second chain I and Q samples 20. In the offline QPCH mode, both first demodulation chain 22 and second demodulation chain 26 are configured not to power on when the mobile station next awakens. Circuitry 10 is configured such that both first chain I and Q samples 17 and second chain I and Q samples 20 will be stored in sample RAM 36 and will be demodulated by accumulator 37. When the mobile station awakens in third state 69, the three inputs will be determined using both first chain I and Q samples 17 and second chain I and Q samples 20. The pilot Ec/Io determined in step 75 will be adjusted downwards by about 2.3 dB to account for the gain achieved with receive diversity and to compare the applicable pilot Ec/Io to the predetermined range.

In a step 79, the portions of circuitry 10 that awakened in first state 67 are put to sleep and no longer consume battery power.

In another example, the mobile station wakes up in second state 68 to monitor first PI bit 42 of QPCH 40 with one receive chain. In step 73, first receive chain 18 extracts first chain I and Q samples 17 from first RF input signal 16 received on first antenna 14. First demodulation chain 22 then demodulates first chain I and Q samples 17 with the inverse of Walsh code 80 ($W_{80}$) applicable to QPCH 40. First demodulation chain 22 also outputs code symbols demodulated with the inverse of Walsh code zero ($W_0$) to allow a calculation of pilot Ec/Io.

In step 74, state machine 66 determines the value of first PI bit 42. In step 75, noise detector 45 determines the pilot Ec/Io using the first chain I and Q samples 17 that were demodulated with the inverse of Walsh code zero ($W_0$). In step 76, processor 34 checks the current state of state machine 66, which is second state 68.

In step 77, processor 34 runs state machine 66. When the value of first PI bit 42 is found to be zero, the mobile station will not awaken to determine the value of second PI bit 43. Instead, the mobile station will awaken either to monitor the slotted paging channel or to monitor the next first PI bit. When the inputs obtained in steps 74-76 while state machine 66 is in second state 68 are (0, 1, 0), the next state remains second state 68. When the inputs obtained in steps 74-76 while state machine 66 is in second state 68 are (0, 1, 1), the next state is third state 69, where the mobile station will monitor the next first PI bit using two receive chains. When the inputs obtained in steps 74-76 while state machine 66 is in second state 68 are (X, 0, X) because the pilot Ec/Io is below the lower limit of the predetermined range, the mobile station will also not awaken to determine the value of second PI bit 43. Instead, the mobile station will awaken to monitor the slotted paging channel.

When the value of first PI bit 42 is found to be one and the pilot Ec/Io is equal to or above the lower limit of the predetermined range, the next state is either a fourth state 70 or a fifth state 71. When the inputs obtained in steps 74-76 while state machine 66 is in second state 68 are (1, 1, 0), the next state is fourth state 70. In that case, the pilot Ec/Io was found to be above the upper limit of the predetermined range, and state machine 66 transitions to fourth state 70 in which the mobile station will awaken to check second PI bit 43 in the QPCH mode with one receive chain. When the inputs obtained in steps 74-76 while state machine 66 is in second state 68 are (1, 1, 1), the next state is fifth state 71. In that case, the pilot Ec/Io was found to be within the predetermined range, and state machine 66 transitions to fifth state 71 in which the mobile station will awaken to check second PI bit 43 in the QPCH mode with two receive chains.

In yet another example, the mobile station wakes up in fifth state 71 to monitor second PI bit 43 of QPCH 40 with two receive chains. When the inputs obtained in steps 74-76 are (X, 0, X) because the pilot Ec/Io is below the lower limit of the predetermined range, the mobile station will next awaken in first state 67 to monitor the slotted paging channel. Likewise, when the inputs obtained in steps 74-76 are (1, X, X) because the value of second PI bit 43 (as well as first PI bit 42) is one, the mobile station will next awaken in first state 67 in order to read the general paging message in paging channel 39. When the value of second PI bit 43 is found to be zero, the mobile station will monitor the next first PI bit in second state 68 or third state 69. When the inputs obtained in steps 74-76 while in fifth state 71 are (0, 1, 0), the next state is second state 68, where the mobile station will monitor the next first PI bit using one receive chain. When the inputs obtained in steps 74-76 in fifth state 71 are (0, 1, 1), the next state is third state 69, where the mobile station will monitor the next first PI bit using two receive chains.

In another embodiment of circuitry 10, the decision to transition from one state to another is not based on the signal-to-noise ratio calculated from I and Q samples. This embodiment lacks noise detector 45. Instead, one input to the state machine in this embodiment is whether circuitry 10 incorrectly detected that both PI bits were set. When the value of both PI bits is determined to be one, the mobile station will next awaken in first state 67 in order to read the general paging message in paging channel 39. Where the general paging message does not contain a page, the state machine determines that circuitry 10 incorrectly detected that both PI bits were set. The state machine remains in first state 67 in the slotted paging mode to monitor a predetermined number of slots. After monitoring the predetermined number of slots, circuitry 10 attempts to determine the value of a first PI bit in third state 69 with two receive chains. Where the value of the second PI bit is determined in fifth state 71 to be one following a determination in third state 69 that the first PI bit is one, the state machine again transitions to first state 67.

Where the value of the first PI bit is determined to be zero in third state 69 or where the value of the second PI bit is determined to be zero in fifth state 71, the state machine transitions to second state 68 and monitors the next first PI bit using one receive chain. The state machine always transitions from second state 68 to fourth state 70 when circuitry 10 detects that the first PI bit is a one. The state machine returns to second state 68 from fourth state 70 when the second PI bit if found to be a zero. Where the value of the second PI bit is determined to be one in fourth state 70 following a determination in second state 68 that the first PI bit is one, and where the state machine thereupon determines that circuitry 10 incorrectly detected that both PI bits were set, the state machine likewise remains in first state 67 in the slotted paging mode to monitor the predetermined number of slots.

Although the present invention has been described in connection with certain specific embodiments for instructional purposes, the present invention is not limited thereto.

Although certain components of circuitry 10, such as noise detector 45, are described above as part of digital mobile station modem 12, those components can be part of RF analog chip 11. Conversely, the invention can be practiced where components of RF analog chip 11 are incorporated into digital mobile station modem 12. Although circuitry 10 is described as reducing the false alarm probability in detecting quick paging bits in the Quick Paging Channel, the invention can also be used to reduce the incidence of incorrectly detecting other information contained in CDMA code channels. An energy efficient method is described above for monitoring the Quick Paging Channel, which uses OOK modulation as defined in the CDMA IS-2000 standard. The method of extending standby time can also be applied, however, to monitoring the paging indicator channel (PICH), which uses binary phase shift keying (BPSK) modulation as defined in the standard offered by a consortium named "$3^{rd}$ Generation Partnership Project" (3GPP) and embodied in a set of documents including Document Nos. 3G TS 25.211, 3G TS 25.212, 3G TS 25.213 and 3G TS 25.214 (the W-CDMA standard).

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Accordingly, the present invention is not intended to be limited to the embodiments shown herein but is to be accorded the widest scope consistent with the principles and novel features disclosed herein.

What is claimed is:

1. A method comprising:
   receiving a signal;
   determining a signal-to-noise ratio of the signal; and
   demodulating a first quick paging bit from the quick paging channel received through both a first receive chain and a second receive chain when the signal-to-noise ratio falls within a predetermined range, and when the quick paging channel is transmitted at a full rate; and
   providing no power to the second receive chain and demodulating a second quick paging bit from the quick paging channel received through the first receive chain when the signal-to-noise ratio is above the predetermined range, and when the quick paging channel is transmitted at the full rate.

2. The method of claim 1, further comprising:
   when the signal-to-noise ratio is below the predetermined range, and when the quick paging channel is transmitted at the full rate, performing the steps of:
   providing no power to the second receive chain; and
   demodulating a general paging message from a regular paging channel received through the first receive chain.

3. The method of claim 1, wherein the signal-to-noise ratio is the signal-to-noise ratio of a pilot channel.

4. The method of claim 1, wherein demodulating a first quick paging bit comprises despreading with a pseudo noise sequence and applying an inverse Walsh code.

5. The method of claim 1, wherein the first quick paging bit is demodulated from I and Q samples.

6. An apparatus comprising:
   means for receiving a signal;
   means for determining a signal-to-noise ratio of the signal;
   means for demodulating a first quick paging bit from the quick paging channel received through both a first receive chain and a second receive chain when the signal-to-noise ratio falls within a predetermined range, and when the quick paging channel is transmitted at a full rate; and
   means for providing no power to the second receive chain and means for demodulating a second quick paging bit from the quick paging channel received through the first receive chain when the signal-to-noise ratio is above the predetermined range, and when the quick paging channel is transmitted at the full rate.

7. The apparatus of claim 6, further comprising:
   when the signal-to-noise ratio is below the predetermined range, and when the quick paging channel is transmitted at the full rate:
   means for providing no power to the second receive chain; and
   means for demodulating a general paging message from a regular paging channel received through the first receive chain.

8. The apparatus of claim 6, wherein the signal-to-noise ratio is the signal-to-noise ratio of a pilot channel.

9. The apparatus of claim 6, wherein demodulating a first quick paging bit comprises despreading with a pseudo noise sequence and applying an inverse Walsh code.

10. The apparatus of claim 6, wherein the first quick paging bit is demodulated from I and Q samples.

11. A non-transitory processor-readable medium for storing instructions operable in a wireless device to:
    receive a signal;
    determine a signal-to-noise ratio of the signal;
    demodulate a first quick paging bit from the quick paging channel received through both a first receive chain and a second receive chain when the signal-to-noise ratio falls within a predetermined range, and when the quick paging channel is transmitted at a full rate; and
    provide no power to the second receive chain and demodulate a second quick paging bit from the quick paging channel received through the first receive chain when the signal-to-noise ratio is above the predetermined range, and when the quick paging channel is transmitted at the full rate.

12. The processor-readable medium of claim 11, and further for storing instructions operable in a wireless device to:
    when the signal-to-noise ratio is below the predetermined range, and when the quick paging channel is transmitted at the full rate:
    provide no power to the second receive chain; and
    demodulate a general paging message from a regular paging channel received through the first receive chain.

13. The processor-readable medium of claim 11, and further for storing instructions operable in a wireless device, wherein the signal-to-noise ratio is the signal-to-noise ratio of a pilot channel.

14. The processor-readable medium of claim 11, wherein demodulating a first quick paging bit comprises despreading with a pseudo noise sequence and applying an inverse Walsh code.

15. The processor-readable medium of claim 11, wherein the first quick paging bit is demodulated from I and Q samples.

16. An apparatus for wireless communication, comprising:
    at least one processor; and
    a memory coupled to the at least one processor, wherein the at least one processor is configured to:
    receive a signal;
    determine a signal-to-noise ratio of the signal;
    demodulate a first quick paging bit from the quick paging channel received through both a first receive chain and a second receive chain when the signal-to-noise ratio falls within a predetermined range, and when the quick paging channel is transmitted at a full rate; and provide no power to the second receive chain and demodulate a second quick paging bit from the quick paging channel received through the first receive chain when the signal-to-noise ratio is above the predetermined range, and when the quick paging channel is transmitted at the full rate.

17. The apparatus of claim 16, wherein, when the signal-to-noise ratio is below the predetermined range, and when the quick paging channel is transmitted at the full rate, the at least one processor is further configured to:

provide no power to the second receive chain; and demodulate a general paging message from a regular paging channel received through the first receive chain.

18. The apparatus of claim 16, wherein the signal-to-noise ratio is the signal-to-noise ratio of a pilot channel.

19. The apparatus of claim 16, wherein demodulating a first quick paging bit comprises despreading with a pseudo noise sequence and applying an inverse Walsh code.

20. The apparatus of claim 16, wherein the first quick paging bit is demodulated from I and Q samples.

\* \* \* \* \*